United States Patent [19]

Runde

[11] Patent Number: 5,333,160

[45] Date of Patent: Jul. 26, 1994

[54] CONTROL ROD POSITION TRANSMITTER

[75] Inventor: Herbert A. Runde, Windsor Locks, Conn.

[73] Assignee: Combustion Engineering, Inc., Windsor, Conn.

[21] Appl. No.: 104,903

[22] Filed: Aug. 12, 1993

[51] Int. Cl.$^5$ .............................................. G21C 17/00
[52] U.S. Cl. ...................................... 376/258; 376/228
[58] Field of Search ................................ 376/258, 228

[56] References Cited

U.S. PATENT DOCUMENTS

| | | | |
|---|---|---|---|
| 3,656,074 | 4/1972 | Bevilacqua et al. | 376/258 |
| 3,857,089 | 12/1974 | Adler et al. | 376/258 |
| 4,508,984 | 4/1985 | Guedj et al. | 376/258 |
| 4,711,757 | 12/1987 | Feilchenfeld et al. | 376/258 |

*Primary Examiner*—Donald P. Walsh
*Assistant Examiner*—Frederick H. Voss
*Attorney, Agent, or Firm*—Ronald P. Kananen

[57] ABSTRACT

Apparatus for sensing and transmitting a signal indicative of the position of a movable ferromagnetic member relative to a fixed structure within which the member moves. The apparatus includes a plurality of magnetic circuit arrangements arranged uniformly along the outside of the fixed structure. Each magnetic circuit arrangement includes a pair of magnets and a pair of arcuate-shaped magnetic path elements extending circumferentially about the fixed structure. A plurality of magnetic field responsive position transmitters are positioned adjacent the magnetic circuit arrangements for sensing the presence of the movable ferromagnetic member at predetermined positions within the fixed structure. The apparatus is particularly useful for monitoring the position of control rods in a nuclear reactor because the monitoring is done from outside the sealed structure.

15 Claims, 5 Drawing Sheets

CONTROL ROD POSITION TRANSMITTER

BACKGROUND OF THE INVENTION

1. Field of the Invention

The present invention relates generally to the providing of an indication of the position of a movable member. More particularly, the present invention is directed to apparatus for sensing and transmitting a signal indicative of the position of a ferromagnetic movable member relative to a fixed structure within which the member moves.

2. Description of Prior Art

While not limited thereto in its utility, the present invention is particularly well suited to the monitoring of the position of control rods in a nuclear reactor. Vertically movable control rods are typically used in nuclear reactors to maintain positive core reactivity control by controlling the overall reactor power level and providing the principal means of quickly and safely shutting down the reactor.

As is well known, in the case of a nuclear reactor, portions of the structure are normally isolated and sealed off to prevent exposure of operating personnel to dangerous amounts of radiation. Accordingly, the positioning of elements such as control rods for a reactor must be performed from a remotely located, central control station. Complicating matters is the fact that the control rods themselves must be positioned within sealed housings which extend from the main body of the reactor structure. Obviously, the less communication from the exterior to the interior of the control rod housing the better, and thus, conventional position indicating apparatus are not suitable for control rod position monitoring.

Theoretically, a hermetically sealed control rod drive, including a drive motor, is to be preferred, and the industry has widely adopted such drives. However, with the hermetically sealed drive, there is nothing extending out of the control rod housing to provide an indication of where the rod is positioned. The drive motor coils are positioned externally of the control rod housing and communicate with the control rod drive through magnetic coupling.

The monitoring of control rod position in a nuclear reactor is further complicated by the fact that the control rods are typically submerged in a fluid, and during operation of the reactor, the temperature of this fluid and of the rod itself becomes quite high (e.g., in excess of 500° F.). The design of position monitoring means is thus complicated by the facts that, if portions thereof are to be physically affixed or connected to the control rod as has been past practice, such portions of the position indicating apparatus must be capable of withstanding high temperatures and must be able to operate while submerged in a fluid such as water.

These restrictions initially confined control rod position monitoring equipment designers to working with mechanical or electromechanical components which were suitable for use within the control rod housing. This limiting of flexibility of design required undesirable communication between the interior and exterior of the control rod housing, as mentioned above. In addition, in the case of a failure in the monitoring apparatus, repair thereof required a lengthy shut down of the reactor.

In U.S. Pat. No. 3,656,074, which is assigned to the same assignee as the present invention, there is described a position indicating apparatus which enables the position of a movable member, such as a nuclear reactor control rod, to be monitored without the necessity of providing communication between the interior and the exterior of the housing in which the movable member is situated. The system described therein includes a magnet located inside the control rod housing on the top of the control rod extension shaft, and a series of magnetically sensitive reed switches on the outside of the control rod housing. By sensing which switches are open or closed, the position of the control rod extension shaft, and therefore, the control rod can be determined.

This use of a magnet and reed switches has proved to be a more accurate and repeatable method of measurement than other methods used by nuclear reactor vendors. However, the magnetic position transmitter as it presently exists is not readily adaptable to all nuclear plants because not all plants were built with a magnet installed on top of the control rod extension shaft. The installation of a magnet within the control rod housing of existing, operating nuclear plants is prohibited by cost and radiation considerations.

SUMMARY OF THE INVENTION

It is an object of the present invention to provide a position indicating apparatus which senses and indicates the position of a moveable member relative to a fixed structure within which the member moves without providing communication between the interior and exterior of the fixed structure.

It is a further object of the present invention to provide a position indicating apparatus which uses an arrangement of external magnets and reed switches to sense and indicate the position of a moveable member relative to a fixed structure within which the member moves.

It is a further object of the present invention to provide a control rod position transmitter which does not require a magnet to be installed on the extension shaft of the control rod within the control rod housing.

It is a further object of the present invention to provide a control rod position transmitter which will permit upgrading the control rod position measurement system on any nuclear plant.

It is a further object of the present invention to provide a control rod position transmitter that is inexpensive and safe to install on existing nuclear plants.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, this invention may comprise an apparatus for transmitting the position of a ferromagnetic movable member to an indicating means, the ferromagnetic movable member being disposed within and movable with respect to an elongated housing. The transmitting apparatus includes a plurality of magnetic circuits arranged at predetermined positions externally along the elongated housing, each circuit comprising at least one magnet and at least one arcuate-shaped magnetic path element generally surrounding the elongated housing. At least one position transmitter assembly is positioned adjacent the magnetic circuits, the position transmitter assembly including a plurality of magnetic field responsive switches for sensing the presence of the ferromagnetic movable member at each of the predetermined positions.

In a further aspect of the present invention, in accordance with its objects and purposes, the invention may comprise a control rod monitoring assembly for a nuclear reactor, comprising an elongated housing, a control rod extension shaft formed of a ferromagnetic material disposed within the elongated housing and movable with respect thereto, and a transmitting apparatus for transmitting a signal representative of a position of the extension shaft. The transmitting apparatus includes a plurality of magnetic circuit arrangements disposed at predetermined positions externally along the elongated housing, each circuit arrangement comprising at least one magnet and at least one arcuate-shaped magnetic path element extending circumferentially about the elongated housing. At least one position transmitter assembly positioned adjacent the magnetic circuits includes a plurality of magnetic field responsive switches for sensing the presence of the ferromagnetic extension shaft at each of the predetermined positions.

BRIEF DESCRIPTION OF THE DRAWINGS

The present invention may be better understood and the foregoing and other numerous advantages resulting therefrom will be obvious to those skilled in the art by reference to the accompanying drawings wherein like reference numerals refer to like elements in the various figures. In the drawings.

DETAILED DESCRIPTION OF THE PREFERRED EMBODIMENT

Reference will now be made in detail to the preferred embodiment of the invention, an example of which is illustrated in the accompanying drawings.

Figure 1:
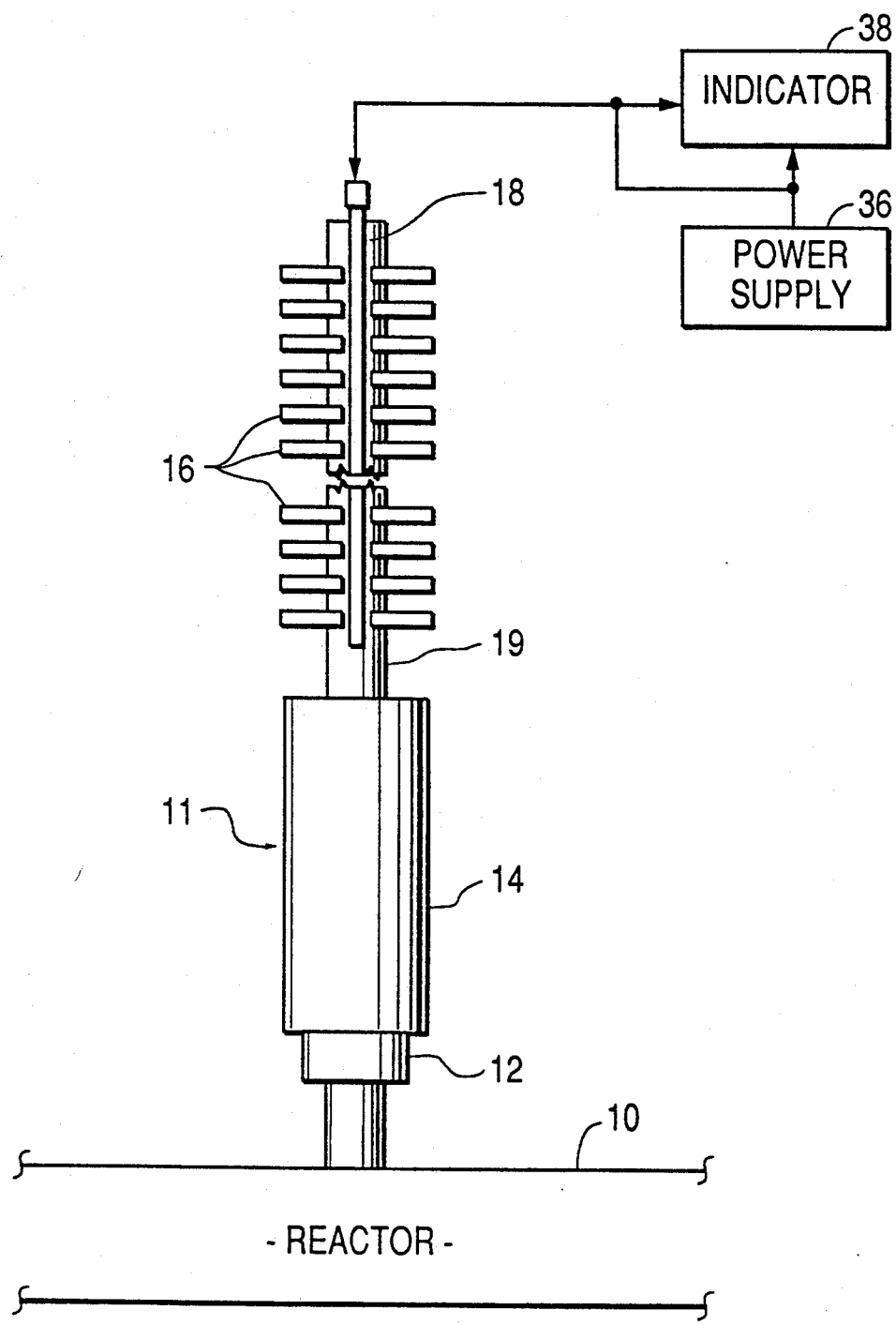
FIG. 1 shows the present invention installed on a control rod housing of a nuclear reactor.

Referring now to FIG. 1 a portion of a nuclear reactor is indicated generally at 10. Extending upwardly from the top of the reactor 10 are a plurality of control rod assemblies (e.g., up to 90 or more), only one of which is shown generally at 11. Control rod assembly 11 typically includes a nonmagnetic stainless steel tubular housing 12 which is about 5 inches in diameter and has a 1 inch thick wall. A movable control rod (not shown) is disposed within the tube and extends down into the main portion of the reactor 10. In the case where the reactor 10 is employed for the heating of water in an electrical power generating application, the control rod assembly 11 will typically be filled with water reaching temperatures up to 550° F. and pressures up to 2200 psi.

Figure 2:
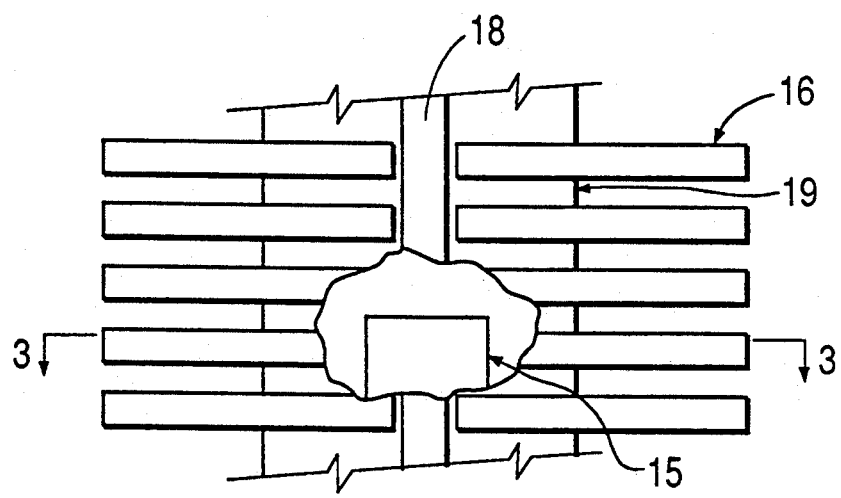
FIG. 2 is a cut-away front view of a portion of the control rod position transmitter of the present invention showing the top end of a movable extension shaft within the control rod housing.
Figure 3:
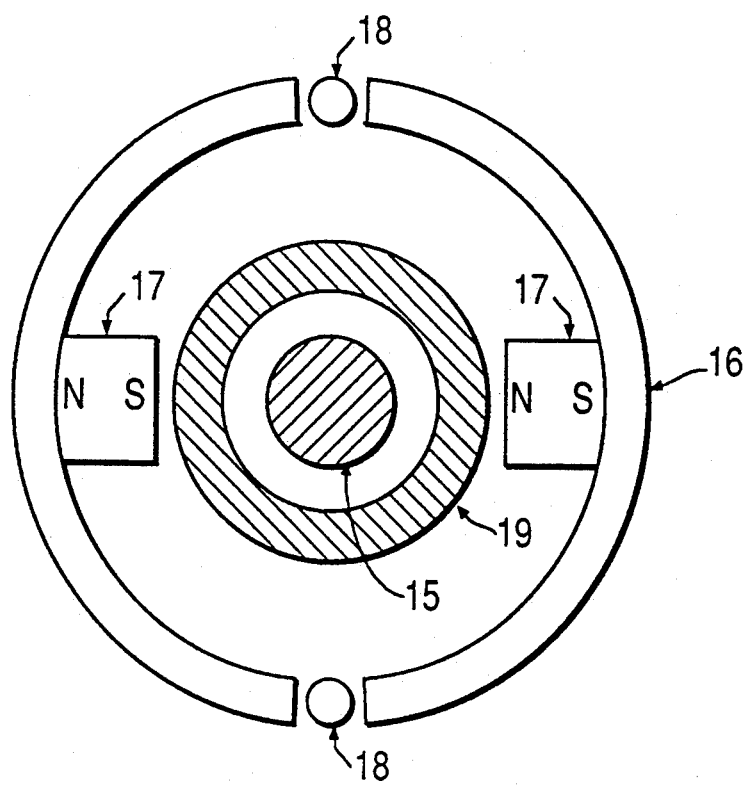
FIG. 3 is a plan view of the present invention taken along line 3—3 of FIG. 2.
Figure 4:
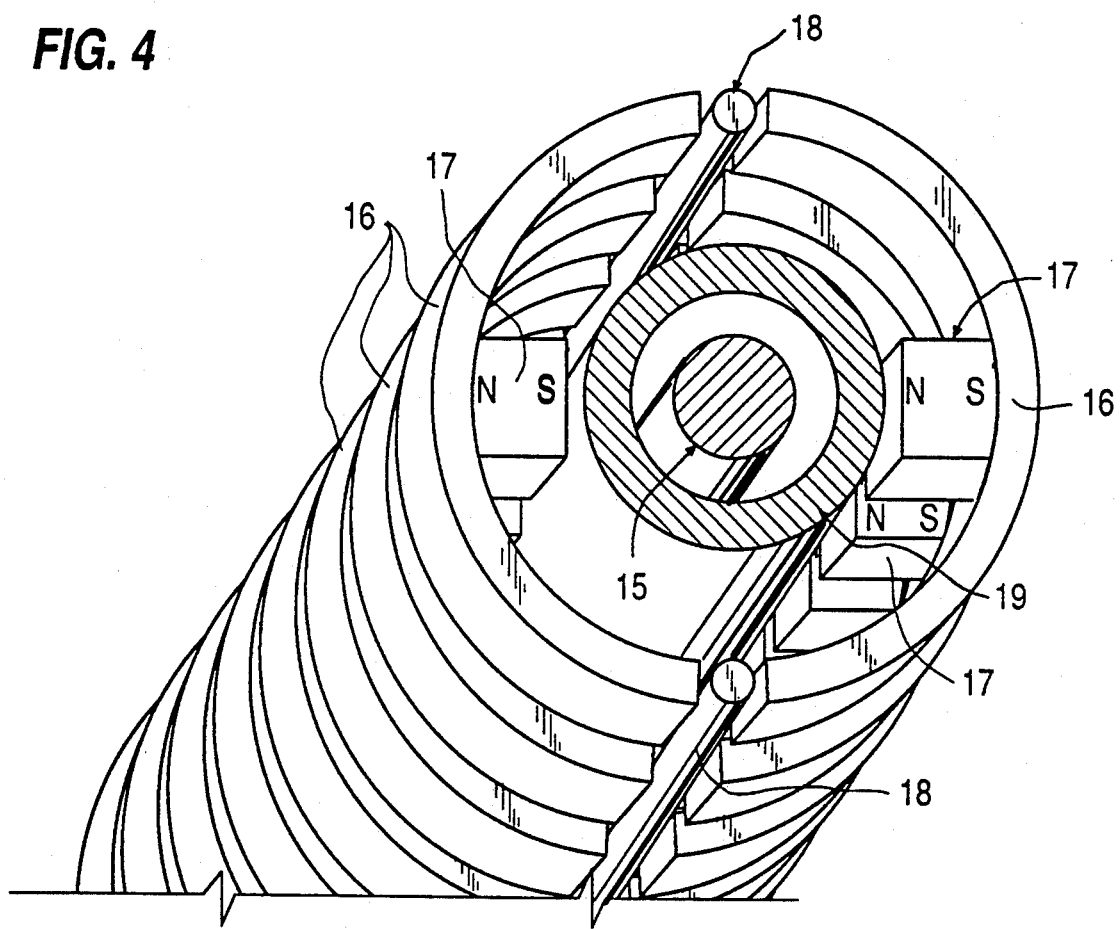
FIG. 4 is a perspective view of the control rod transmitter of FIG. 2.

A control rod drive coil stack 14 is mounted on the control rod assembly 11. Magnetic flux from the coil stack 14, acting through the stainless steel housing 12, causes the control rod inside the housing to move axially, thus adjusting the position of the control rod relative to the reactor core 10. As the control rod is withdrawn from the reactor, a control rod extension shaft 15 (see FIGS. 2-4) moves up into an extension shaft housing 19 above the control rod assembly 11. The extension shaft 15 is present in virtually all conventional nuclear reactor plants and is formed of a ferromagnetic material.

The above described components of a nuclear power plant are conventional and merely provide an exemplary environment in which the present invention is particularly well adapted. The position transmitter according to the present invention will be described in detail herebelow.

In the above described nuclear power plant, the vertical position of the control rods may be detected by detecting the position of the extension shaft 15 inside the extension shaft housing 19. The control rod position transmitter of the present invention includes a number of magnetic circuits located on the outside of the extension shaft housing 19 at a predetermined number of elevations. For example, the magnetic circuits may be spaced one inch apart over an eleven foot length of the extension shaft pressure housing 19. Each magnetic circuit has at least one magnet 17, a carbon steel magnetic path 16 surrounding the extension shaft housing 19, and at least one longitudinally extending reed switch position transmitter 18. In the illustrated embodiment of FIGS. 3 and 4, there are provided a pair of magnets 17 and a pair of reed switch position transmitters 18 to provide redundant monitoring for increased reliability. The reed switch position transmitters 18 may take the form of the reed switch transmitters disclosed in U.S. Pat. No. 3,656,074, the explanation of which is incorporated herein by reference.

At each elevation, a measurement is made by providing a magnetic circuit around the extension shaft housing 19 which senses the presence of the ferromagnetic extension shaft 15 depending on how far the control rod is withdrawn. The strength of the magnetic field in the area of the reed switches of the position transmitters 18 will be dependent on the reluctance of the magnetic circuit, which in turn depends on how much ferromagnetic material is in the magnetic circuit. Since the ferromagnetic extension shaft 15 moves in the path of the magnetic field, the magnetic field strength at a particular elevation in the area of a particular reed switch will be greater if the extension shaft 15 is at or above that elevation, and less if the extension shaft 15 is below that elevation. The sensitivity of the reed switches is chosen so that they will close in the stronger magnetic field and open in the lesser field. By providing a means of monitoring which switches are closed and which are open, the location of the extension shaft 15, and thus, the control rod can be determined with a relatively high degree of accuracy.

Figure 5A:
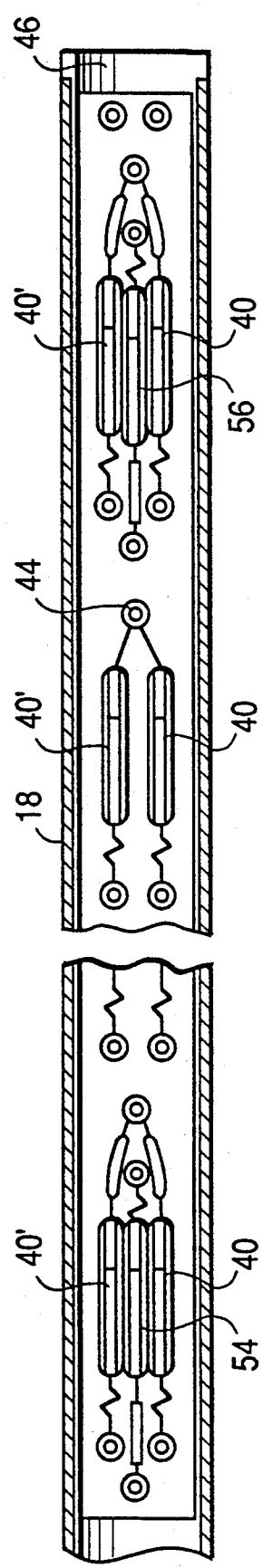
FIG. 5a is a plan view of the transmitter housing and included circuitry wherein a portion of the housing is cut away.
Figure 5B:
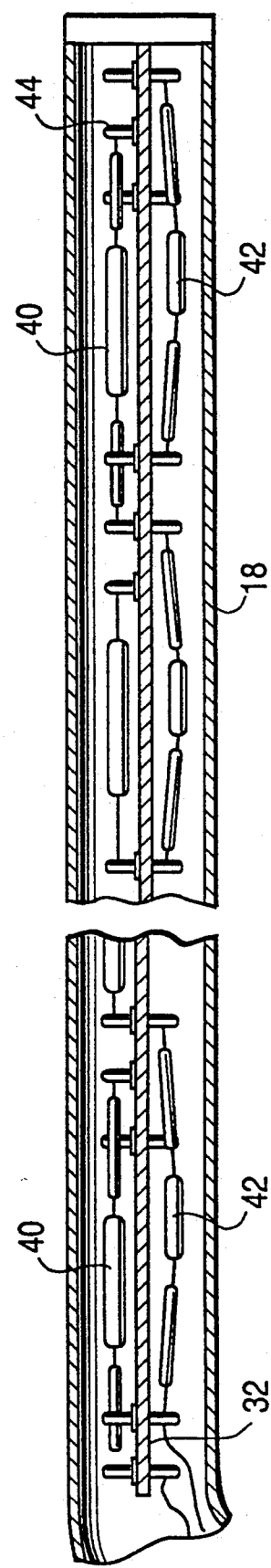
FIG. 5b is a side view of the transmitter housing and included circuitry with a portion of the housing cut away.

FIGS. 5(a) and 5(b), respectively, show top and side views of a transmitter circuitry located within the housing of the position transmitters 18 through cut away portions of the housing. Shown within the housing is a terminal strip 32 to which are mounted flux responsive reed switches 40 and 40' and other components of an incremental potentiometer of the position transmitter. The reed switches 40 and 40' are spaced along the terminal strip 32 at uniform incremental distances corresponding with each predetermined elevation of the magnetic circuitry.

The other components of the incremental potentiometer, shown in FIGS. 5(a) and 5(b) as resistors 42, are mounted to the terminal strip 32 and are electrically interconnected by means of stand off and feed through connectors 44. It will be realized that a terminal strip containing a printed circuit, rather than stand off connectors 44, may be used for component connection. When the terminal strip 32 is inserted fully within the housing of the position transmitters 18, the lower end of the housing is capped by an end cap 46 which both seals the housing end and provides a mounting support for the terminal strip within.

Figure 6:
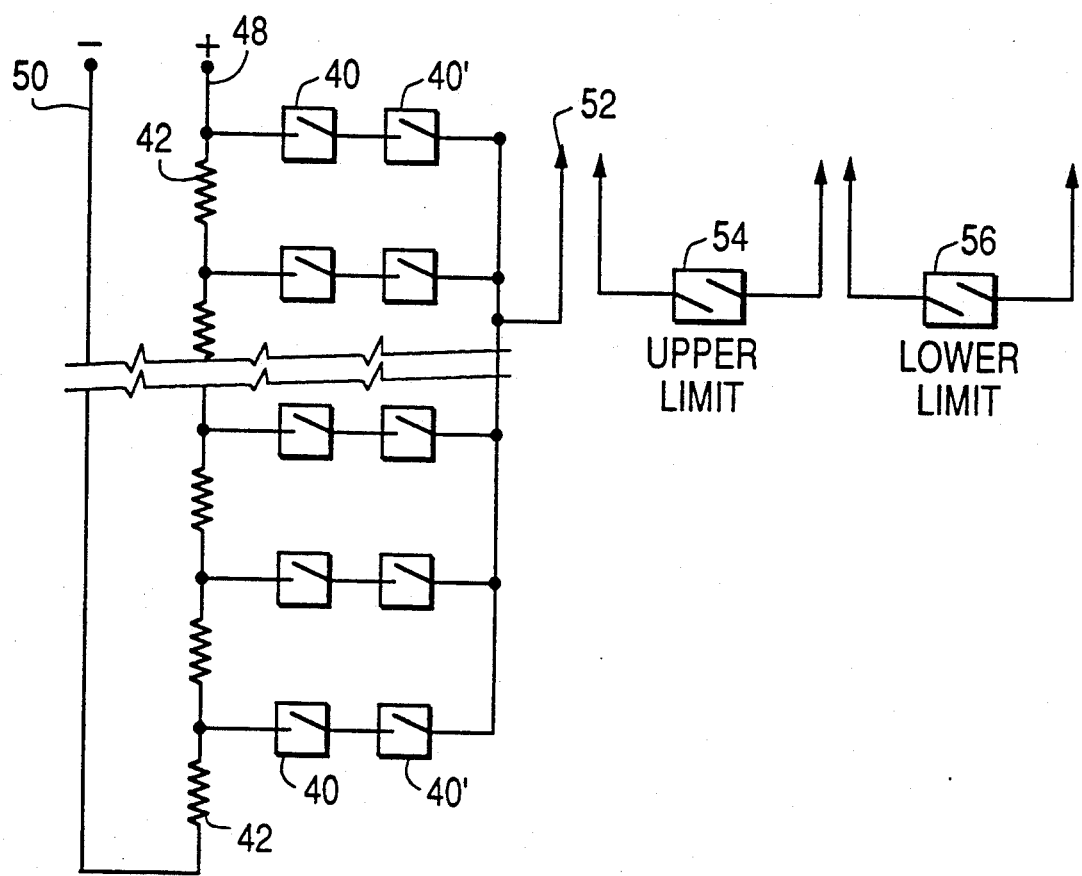
FIG. 6 is a schematic diagram of the electrical circuit of a preferred embodiment of the present invention.

Referring to FIG. 6, the electrical portions of a preferred reed switch position transmitter arrangement are shown schematically. A plurality of resistors 42 of the same size and type are connected at end points 48 and 50 across the power supply 36 (FIG. 1) to form an incremental potentiometer or voltage divider. Reed switches 40' are electrically connected in series with each of switches 40 and are positioned in substantially the same locations as switches 40. Each of reed switches 40 is connected to a different point or tab on the voltage divider comprising resistors 42. All of the circuits comprising the series connected switches 40 and 40' are connected to a signal bus bar having a terminal point 52. Thus, upon the closing of one of the switches 40 and its serially connected back up switch 40', a signal from the incremental potentiometer comprising resistors 42 will be applied to bus bar terminal 52. The amplitude of this signal indicates the uppermost one of the switch pairs 40 and 40' which is at that instant subject to the altered magnetic field caused by the presence of the control rod extension shaft 15.

Thus, a continuous, incrementally varying signal is provided which is indicative of control rod position. This signal may then be provided to any indicating means 38 which is responsive to the signal provided. Indicator means as simple as a voltmeter calibrated to represent control rod position may be used with the circuit described. One skilled in the art will recognize various systems which are capable of responding to the signal provided by the described position transmitter to provide continuous indication of control rod position, as by digital read out, etc. In a preferred embodiment of the present invention, third reed switches 54 and 56 may be mounted adjacent each of the upper and lower extreme positions of the reed switches 40 and 40'. The third switches 54 and 56 function as upper and lower limit switches for the control rod drive. Thus, when the control rod reaches either of its limits of longitudinal motion, one of the switches 54 and 56 will be closed by the change in magnetic field and will permit current flow to appropriate circuitry (not shown) for disabling or reversing the drive motor coils 14 and energizing a visual or audible alarm.

The arrangement of external magnets and reed switches of the present invention provides a more accurate and stable method for determining the position of control rods in a nuclear reactor. Further, this arrangement can be readily incorporated into existing nuclear power plants that do not contain magnets installed on their extension shaft without risking radiation contamination.

The illustrated embodiment was chosen and described in order to best explain the principles of the invention and its practical application to thereby enable others skilled in the art to best utilize the invention and various embodiments and with various modifications as are suited to the particular use contemplated. Other arrangements which could optimize the magnetic circuitry or minimize the number of required components are within the scope of the invention. It is intended that the scope of the invention only be limited by the claims appended hereto.

We claim:

1. An apparatus for transmitting the position of a ferromagnetic movable member to an indicating means, said ferromagnetic movable member being disposed within and movable with respect to an elongated housing, said transmitting apparatus comprising:
    a plurality of magnetic circuits arranged at predetermined positions externally along said elongated housing, each circuit comprising at least one magnet and at least one arcuate-shaped magnetic path element generally surrounding said elongated housing; and
    at least one position transmitter assembly positioned adjacent said magnetic circuits, said position transmitter assembly including a plurality of magnetic field responsive switch means for sensing the presence of said ferromagnetic movable member at each of said predetermined positions.

2. A position transmitting apparatus as set forth in claim 1, wherein said at least one magnet of each magnetic circuit comprises two magnets located on opposite sides of said elongated housing.

3. A position transmitting apparatus as set forth in claim 2, wherein said at least one arcuate-shaped magnetic path element of each magnetic circuit comprises two arcuate-shaped magnetic path elements located on opposite sides of said elongated housing.

4. A position transmitting apparatus as set forth in claim 3, wherein said at least one position transmitter assembly comprises two elongated position transmitter assemblies located on opposite sides of said elongated housing, each position transmitter assembly comprising a plurality of magnetic field responsive switches.

5. A position transmitting apparatus as set forth in claim 4, wherein each of said arcuate-shaped magnetic path elements are formed of carbon steel.

6. A position transmitting apparatus as set forth in claim 5, wherein each of said position transmitter assemblies are disposed between respective ends of said arcuate-shaped magnetic path elements.

7. A position transmitting apparatus as set forth in claim 6, wherein said magnetic field responsive switches comprise reed switches that close when the ferromagnetic movable member is located in the magnetic field of an adjacent magnetic circuit.

8. A position transmitting apparatus as set forth in claim 7, wherein said magnetic circuits and said magnetic field responsive switches are uniformly spaced along said elongated housing.

9. An apparatus for transmitting the position of a ferromagnetic movable member to an indicating means, said ferromagnetic movable member being disposed within and movable with respect to an elongated housing, said transmitting apparatus comprising:

a plurality of magnetic circuit arrangements disposed at predetermined positions externally along said elongated housing, each circuit arrangement comprising at least one magnet and at least one arcuate-shaped magnetic path element extending circumferentially about said elongated housing; and a position transmitter assembly positioned adjacent said magnetic circuits, said position transmitter assembly including a plurality of magnetic field responsive switch means for sensing the presence of said ferromagnetic movable member at each of said predetermined positions.

10. A control rod monitoring assembly for a nuclear reactor, comprising:

an elongated housing;

a control rod extension shaft formed of a ferromagnetic material disposed within said elongated housing and movable with respect thereto; and a transmitting apparatus for transmitting a signal representative of a position of the extension shaft, said transmitting apparatus comprising:

a plurality of magnetic circuit arrangements disposed at predetermined positions externally along said elongated housing, each circuit arrangement comprising at least one magnet and at least one arcuate-shaped magnetic path element extending circumferentially about said elongated housing; and at least one position transmitter assembly positioned adjacent said magnetic circuits, said position transmitter assembly including a plurality of magnetic field responsive switch means for sensing the presence of said ferromagnetic extension shaft at each of said predetermined positions.

11. A control rod monitoring assembly as set forth in claim 10, wherein said elongated housing is sealed to contain high water pressures and temperatures therein.

12. A control rod monitoring assembly as set forth in claim 11, wherein said at least one magnet of each magnetic circuit comprises two magnets located on opposite sides of said elongated housing.

13. A control rod monitoring assembly as set forth in claim 12, wherein said at least one arcuate-shaped magnetic path element of each magnetic circuit comprises two arcuate-shaped magnetic path elements located on opposite sides of said elongated housing, each of said magnetic path elements having a generally semi-circular shape.

14. A control rod monitoring assembly as set forth in claim 13, wherein each of said arcuate-shaped magnetic path elements are formed of carbon steel.

15. A control rod monitoring assembly as set forth in claim 14, wherein said at least one position transmitter assembly comprises two elongated position transmitter assemblies disposed between respective ends of said arcuate-shaped magnetic path elements.

* * * * *